3,585,731
Patented June 22, 1971

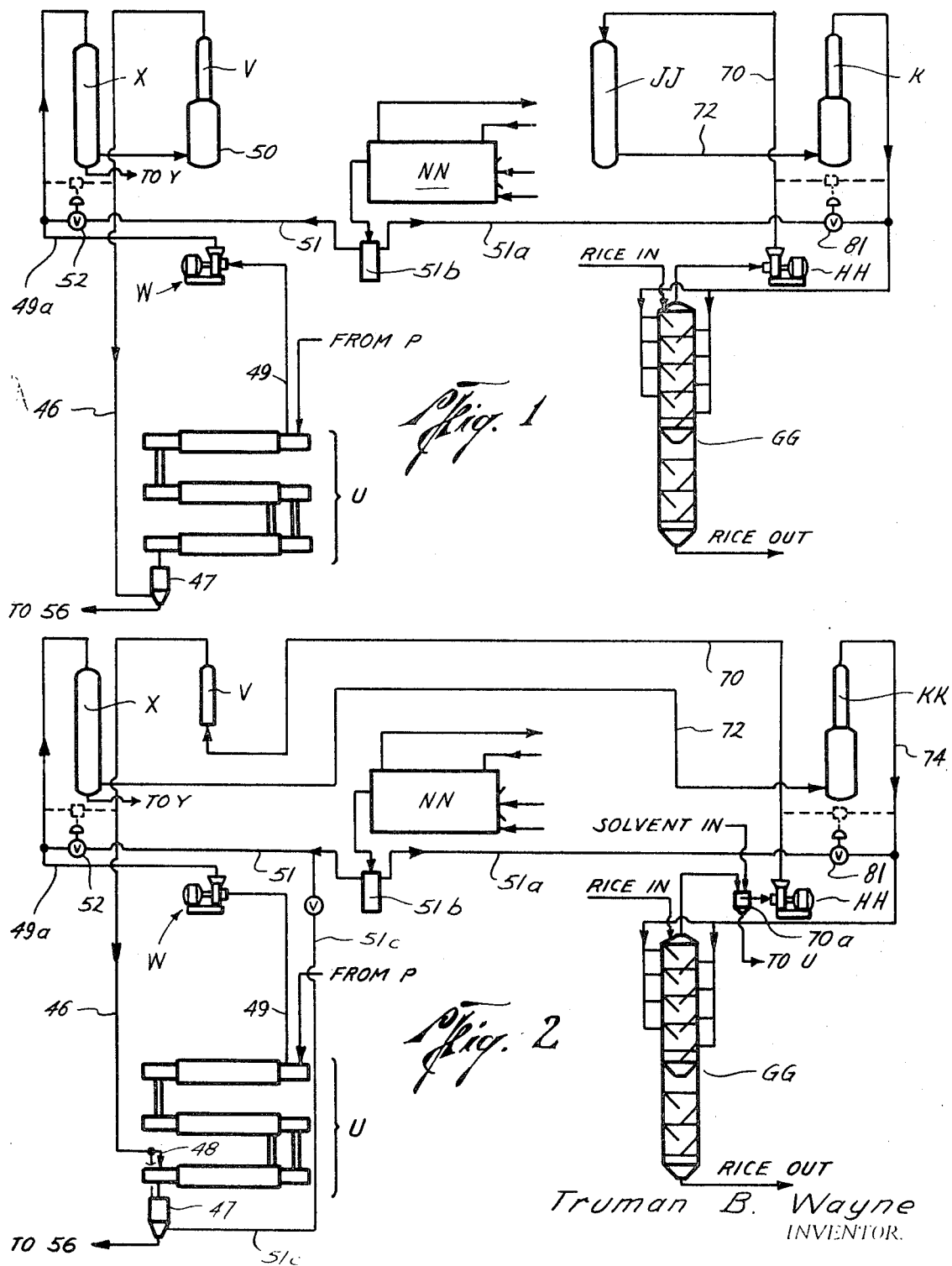

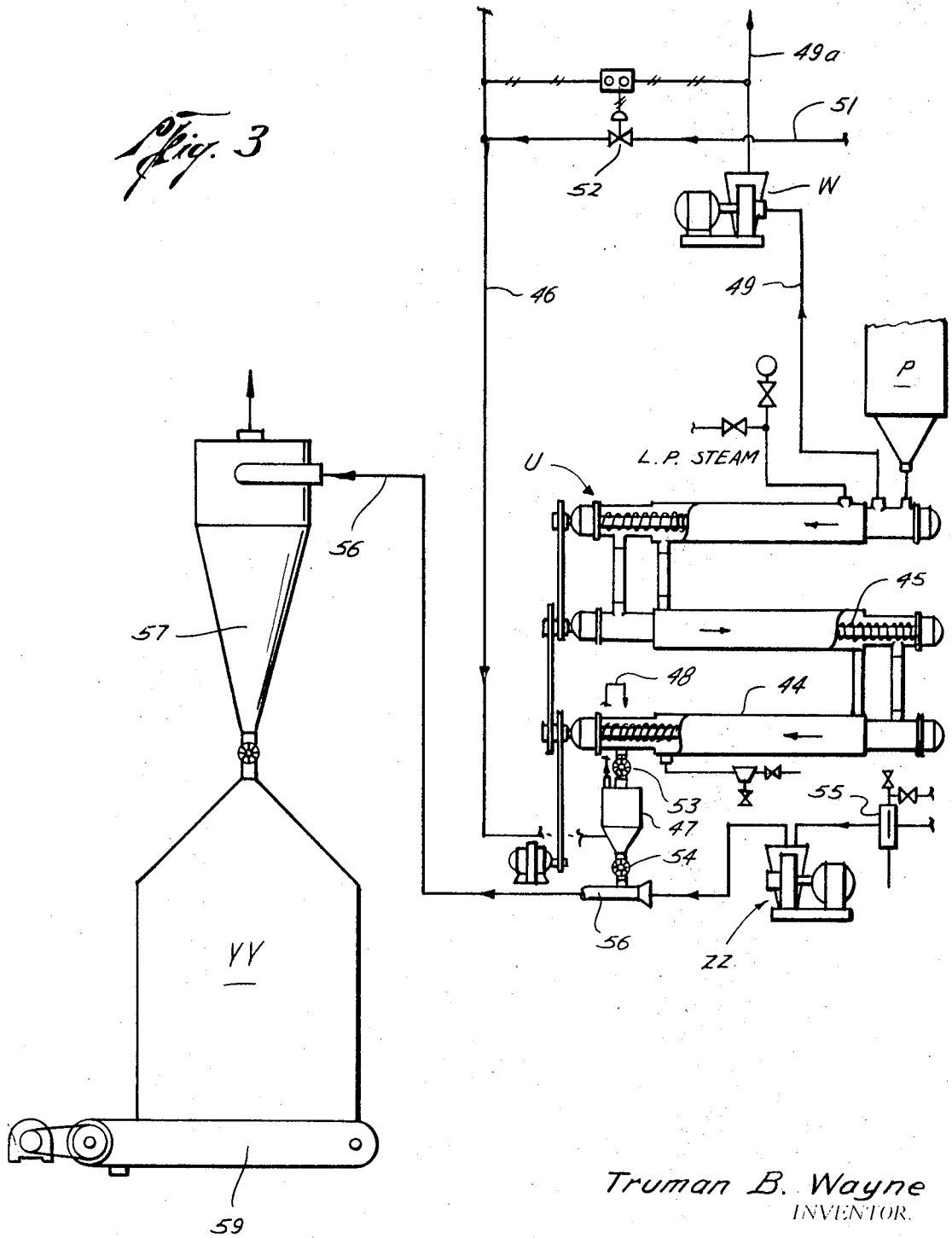

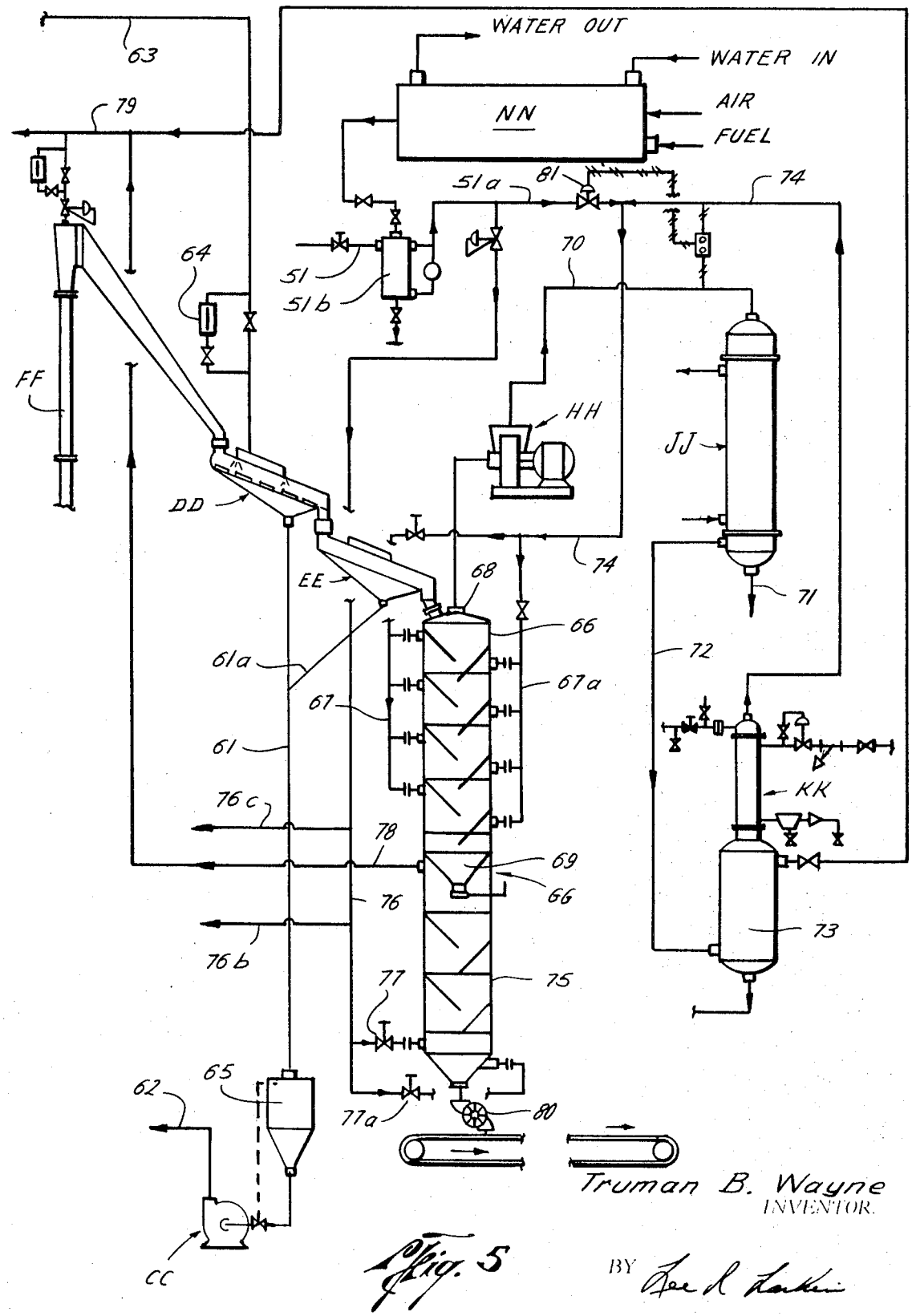

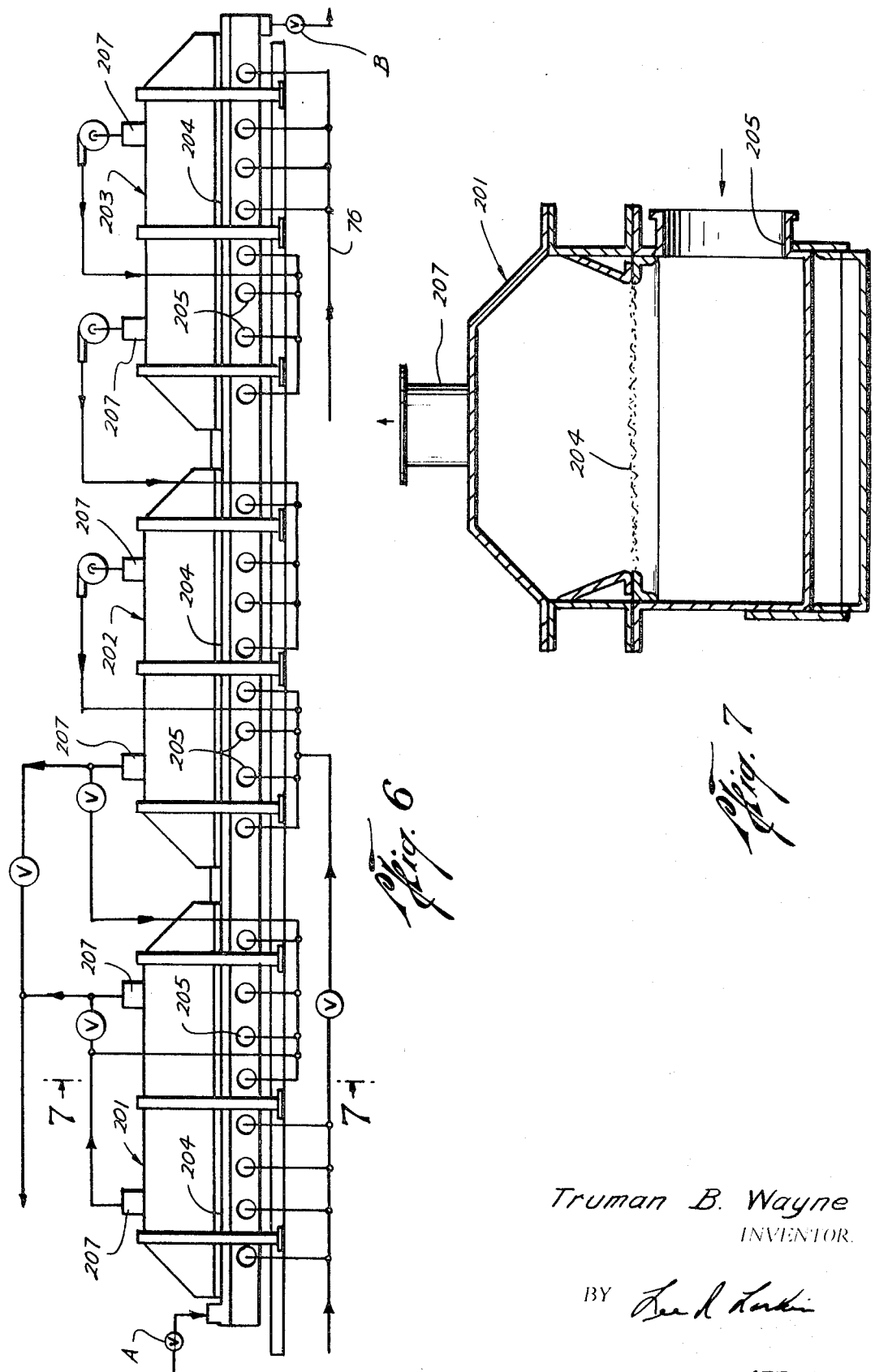

3,585,731
METHOD FOR DESOLVENTIZING SOLVENT
EXTRACTED MILLED RICE
Truman B. Wayne, P.O. Box 13086,
Houston, Tex. 77019
Continuation-in-part of application Ser. No. 529,814,
Feb. 24, 1966. This application Jan. 4, 1968, Ser.
No. 695,632
Int. Cl. F26b 3/00
U.S. Cl. 34—27    16 Claims

ABSTRACT OF THE DISCLOSURE

A method and apparatus of desolventizing previously solvent extracted milled rice and, in certain embodiments of the invention, desolventizing of the bran removed from the rice. The method and apparatus contemplates using a desolventizing gaseous medium comprising inert gas as the major component thereof wherein the gaseous medium is contacted with the rice when at a temperature in the range from about 100° F. to about 150° F., whereby the solvent is vaporized from the rice at a relatively low temperature, thereby preserving the quality of the rice. The gaseous medium with the vaporized solvent entrained therein is subsequently condensed to remove the solvent therefrom and the medium is subsequently heated and recycled.

---

This application is a continuation-in-part of copending application Ser. No. 529,814 filed Feb. 24, 1966 (now Pat. No. 3,421,902), by the same inventor.

This invention relates to a method and apparatus for desolventizing previously solvent extracted milled rice. More particularly, it relates to a method of desolventizing solvent extracted milled rice with a gaseous medium comprising inert gas as the major component thereof, wherein the gaseous medium is contacted with the rice at a relatively low temperature and on the order of from about 100° F. to about 150° F., whereby the quality of the rice is preserved during the desolventizing thereof.

There has recently come into use various apparatus and methods for milling and solvent extracting brown rice. Examples of such apparatus and methods are taught in the following U.S. Letters Patents, for example: Pat. No. 3,165,134; Pat. No. 3,217,769; Pat. No. 3,261,690 and Pat. No. 3,330,666.

In the milling of rice, it is desirable to maintain as many whole milled kernels as possible with the smallest amount of checking or breaking as possible. However, rice kernels, particularly milled rice, are very sensitive to changes in not only temperature, but water and solvent content. During the process of removing the solvent from solvent extracted milled rice, unless great care is exercised, the rice kernels have a great tendency to check or crack or break and in some instances, to assume an undesirable rather chalky white appearance.

Many apparatus and methods have been developed for the purpose of desolventizing various solvent extracted particles. Patents which are representative of the prior art include the following U.S. patents: Pat. No. 2,571,143; Pat. No. 2,618,560; Pat. No. 2,691, 830 and Pat. No. 2,811,539

However, it has been found that none of the prior art apparatus and methods are completely successful with respect to the desolventization of solvent extracted milled rice for various reasons, including excessive breakage of kernels by the violent agitation of the particles, excessive heat and the like It is therefore an object of this invention to provide an improved method and apparatus for desolventizing previously solvent extracted milled rice, and in some instances, desolventizing the bran removed from the rice, which apparatus and method overcome the aforesaid shortcomings of the prior art.

It is still another object of this invention to provide an improved apparatus and method for desolventizing solvent extracted milled rice which preserves the integrity of the rice kernels during the operation.

Another object is to provide an improved extractive milling process wherein difficulties in the vapor handling and recovery systems are eliminated by feeding clean kernels of rice substantially free of loose polish to the desolventizing operation.

Still another object is to provide an improved desolventizing procedure in an extractive milling process which minimizes chalking and development of fissures in kernels of the rice and removes residual solvent to the desired limits.

Another object is to provide an improved extractive milling process wherein hazards due to vapor and dust explosions are minimized.

Other objects and advantages will become apparent to those skilled in the art from the following description and the attached drawings.

An improved desolventizing procedure for the clean rice is contemplated which effects substantial savings in equipment costs, and produces a desolventized clean rice of improved appearance and free from residual solvent. The present process also avoids problems in processing due to a large quantity of fine bran and polish residues remaining on the finished rice.

Briefly stated, the method of this invention contemplates passing solvent extracted milled rice through a first chamber. A desolventizing gaseous medium comprising inert gas as the major component thereof is passed through the first chamber to thereby vaporize solvent contained in the rice. The medium is at a temperature in the range from about 100° F. to 150° F. upon introduction into the first chamber. Thereafter, the medium is withdrawn from the first chamber with the vaporized solvent contained therein and with the medium being at a temperature within the range of about 95° F. to about 120° F. A major portion of the vaporized solvent is then condensed from the withdrawn medium, with the medium subsequently being heated and recycled through the first chamber.

It is preferred that the medium be substantially oxygen free and that the inert gas portion of the medium be a combustion gas resulting from a substantially perfect combustion of a hydrocarbon fuel. The medium will preferably be substantially water-saturated upon withdrawal from the first chamber. In certain embodiments of the invention, additional inert gas is added to the medium to make up losses of gas therefrom. In certain embodiments of the invention, the rice may pass to a second chamber containing a gaseous medium comprising inert gas as the major component thereof to further desolventize the rice. In still further embodiments of the invention, the bran which has previously been removed from the rice and solvent extracted may also be desolventized with a gaseous medium comprising inert gas supplied from a common source or that used to desolventize the rice.

Briefly stated, the apparatus of this invention for desolventizing solvent extracted milled rice includes a housing arranged for passage of the rice therethrough in a semi-fluidized state, with the housing having inlet and outlet means for passing a desolventizing gaseous medium comprising inert gas as a major component therethrough and in intimate contact with the rice therein to thereby vaporize solvent from the rice. The apparatus also includes a system for generating and recycling the medium through the housing, which system comprises a gas generator for generating inert gas to make up the medium, a heater for heating the medium to a temperature in the range of from about 100° F. to about 150° F. upon introduction into the housing. It also includes first conduit means for conducting the heated medium from the heater to the inlet of the housing, a compressor connected to receive the medium from the outlet of the housing and to deliver the medium under pressure to thereby provide a driving force for the medium through the housing; and a second conduit means arranged to receive the pressurized medium from the compressor. It also includes condenser means connected to receive the said medium transmitted by the second conduit means for condensing solvent vapors from the medium third conduit means for conducting said mediums from the condenser to the heater, and valve means connected to be responsive to the pressure differential between the medium in the first and second conduit means and arranged for delivering additional inert gas generated by the generator to said medium when the pressure differential exceeds a predetermined limit. Certain embodiments of the apparatus may also include means for circulating a gaseous medium through another housing through which the bran is passed, and in certain instances, the desolventizing medium may be the same for both housings, as will be explained hereinafter.

Preferably the last washing of the rice fraction is conducted with fresh solvent on a vibrating screen so that any residual particles of bran and polish are completely removed from the rice which is again shaken on a vibrating screen to free it of adhering solvent before introduction of the rice into a desolventizer. Elimination of bran and polish particles from the rice fraction prior to introducing the rice into a desolventizing step eliminates difficulties due to accumulation of these materials in recovery steps subsequent to desolventizing wherein the solvent is recovered from the recirculated gas stream.

The desolventizing step preferably is conducted by passing the rice through a housing containing warm inert gas, preferably combustion gases, for vaporizing solvent from the rice. Preferably warm inert gas containing solvent vapor from the desolventizer passes through a recycling system in which the gas is cooled, evaporated solvent contained therein is condensed and separated from the gas, and the gas is reheated and returned to the desolventizer. Such recycle of desolventizer gas prevents buildup of solvent vapor in the desolventizing gas to an explosive level, and assists in a very high rate of recovery of solvent from the used gas.

For some reason, at present unknown, a mixture of gases resulting from substantially perfect combustion of a hydrocarbon material, such as natural gas in air and containing as its principal components nitrogen, carbon dioxide and water vapor, decreases chalking of the rice during desolventizing and gives the rice a better appearance. It is believed that this effect is due to the prevention of water loss from the outer layers of the milled kernel by the moisture content of the inert gas mixture.

Reference to the drawings will further explain the invention wherein like numerals refer to like parts and in which:

FIG. 1 is a simplified and highly schematic drawing showing the arrangement of the system for generating and recycling the gaseous medium as taught and explained in greater detail in FIGS. 3–5.

FIG. 2 is a simplified and highly schematic alternative embodiment of another system for generating and recycling a gaseous medium.

FIG. 3 shows a portion of the apparatus for desolventizing the bran fraction obtained from a solvent extraction milling process.

FIG. 5 is a considered an extension of FIGS. 3 and 4 and shows in particular one means for generating the inert gas and one means for contacting the gaseous medium with the rice.

FIG. 6 is a generally side elevation view in schematic form showing an alternate housing for contacting the rice with the gaseous medium.

FIG. 7 is a cross-sectional view taken generally along line 7—7 of FIG. 6.

Figure 4:
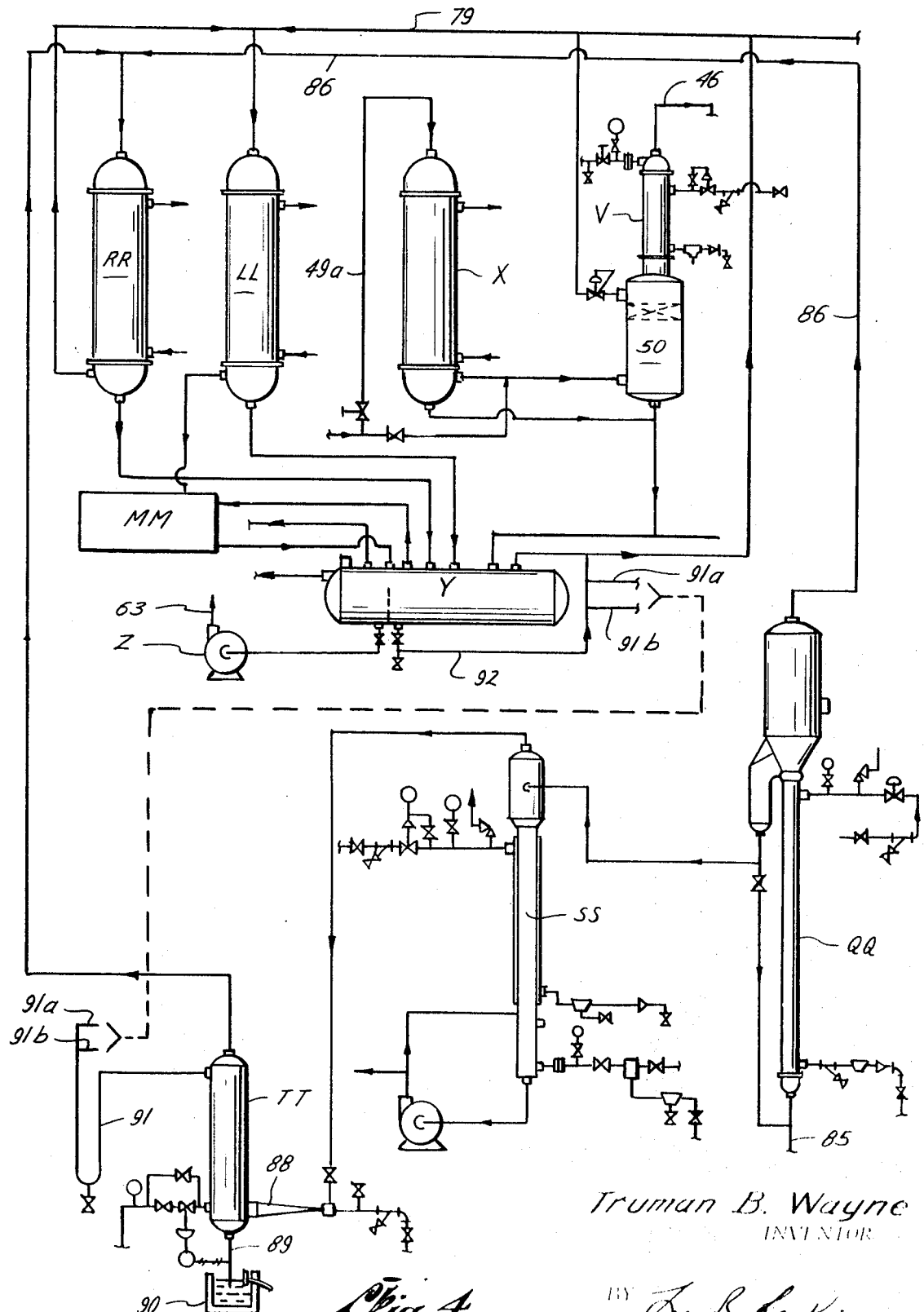
FIG. 4 shows a portion of the system which is considered to be an extension of FIG. 3 and particularly shows one means for condensing the gaseous medium.

Referring now to the drawings, the bran cake, which has been solvent extracted, is discharged directly into bran desolventizer U which comprises two or more steam-jacketed cylindrical sections 44 in each of which a cut-flight screw conveyor 45 receives the bran cake at the head end of each section and discharges it at the opposite end into the succeeding cylindrical section. Steam or a hot liquid is circulated in the jackets of the two or more cylindrical sections to heat the bran meal which quickly forms from the bran cake received into the first section, and causes evaporation of the solvent.

This bran meal is treated in countercurrent manner with superheated inert gas, or a mixture of superheated inert gas and solvent vapor, which has been heated to an elevated temperature, usually within the range of 150°–330° F., in recycle gas heater V (FIG. 4) and delivered through duct 46 into bran holder 47 and is circulated through the dried bran meal and escapes through duct 48 into the lower cylindrical section of bran desolventizer U and continues countercurrently upward through the upper dryer sections and escapes through duct 49 from which it is drawn into recycle gas blower W and is delivered by means of duct 49a to recycle gas condenser X (FIG. 4) wherein the evaporated solvent vapor is condensed and removed as liquid solvent in the knockout drum section 50 of recycle gas heater V, and is collected in solvent separator Y where the solvent is settled from its water content and is returned to the extraction plant by means of solvent pump Z and pipe 63.

The residual gas which comprises a mixture of inert gas and solvent vapor is then reheated to a temperature of 150°–330° F. and is recycled through duct 46 to the bran holder 47, and the cycle is repeated. Any decrease in pressure within the recycle gas system due to gas losses or condensation of solvent vapors by condenser X is regained by supplying inert gas from duct 51 (FIG. 5) through differential pressure control valve 52 (FIG. 3) which maintains a constant differential pressure within the range of 5" to 10" W.P. between ducts 46 and 49a, with the pressure always higher in duct 49a.

The fully desolventized, deodorized rice bran is discharged from bran desolventizer U through vapor lock 53 into bran holder 47 and is then recovered through a second vapor lock 54 by the bran cooling and transporting system which comprises bran cooling blower ZZ, air drying heater 55 which heats the air above its dewpoint, blow-pipe 56, cyclone collector 57 and bran bin YY which is equipped with a suitable live bottom conveyor arrangement 59 for the removal of bran from the bin. The desolventized bran may be screened to remove small broken rice particles prior to sacking and bulk shipments. The storage and subsequent handling of the bran are conventional and do not comprise part of this invention.

The washed rice from the solvent extractive milling process, which still contains small amounts of dilute, oil-containing solvent and some polish fines, is elevated to vibratory washer DD by means of elevator FF where it is successively washed with pure solvent obtained from solvent pipe 63 (FIG. 5). The solvent is preferably metered through rotameter 64 and is forced through the two spray headers at the termini of solvent pipe 63. The washings drain through pipe 61 to surge tank 65 which supplies pump CC. The washed rice, now substantially free of oil-containing solvent and polish fines, but still wet with fresh rinse solvent, passes to vibratory desolventizer EE where most of the remaining surface and interstitial solvent is shaken off and drains through pipe 61a to pipe 61 and thence to surge tank 65.

The cleanly milled rice, which still contains some absorbed and surface solvent on the order of about 6% by weight or less is then discharged at a temperature preferably in the range of about 105° F. to about 115° F. to rice desolventizer GG (FIG. 5) which, in the embodiment shown, comprises a vertical column having an upper section 66 with internal staggered baffles, oppositely placed recycle gas manifolds 67 and 67a, an exhaust stack 68 and a hoppered bottom 69 which is equipped with a slide gate. The column is filled and recycle gas blower HH is started to establish desolventizing gas circulation into this blower from recycle gas stack 68 into exhaust duct 70 and thence into recycle gas condenser JJ where all or any desired part of the solvent in the recycle gas may be condensed and drained to pipe 71 which delivers to solvent separator Y (FIG. 4). The remaining gas, now saturated with respect to the solvent vapor and moisture, passes through duct 72 to the knockout section 73 of recycle gas heater KK and thence into the tubular heater section where it is superheated to a temperature sufficient to have evaporative ability when recycled to upper section 66 of the rice desolventizer through duct 74 which supplies the recycle gas manifolds 67 and 67a. To prevent cracking of the rice, the entering gas temperature is preferably within the range of 100°–150° F. The solvent-saturated gas leaving the desolventizer to be recycled usually is at a temperature of 95°–120° F.

During startup, when the rice in upper section 66 is sufficiently desolventized, the slide gate in hopper bottom 69 is opened and circulation into lower deodorizer section 75 of the apparatus is established. As desolventized rice enters section 75, additional solvent-wet rice enters the upper section 66. When both column sections are full, inert gas is admitted from pipe 76a through flow control valves 77 and 77a. The inert gas is forced upwards through the rice to remove the last traces of solvent, and is exhausted through stack 78 into main vent header 79 which collects solvent vapors from the high point of all apparatus in which they occur. The main vent header terminates to vent condenser LL (FIG. 4) which condenses most of the solvent vapors and delivers the liquid solvent to solvent separator Y. Any uncondensed solvent vapors are sent from the vent condenser to the solvent vapor recovery system MM which may be of any conventional type. Its condensate is returned to solvent separator Y.

The desolventized, deodorized milled rice product is then delivered through rotary vapor lock 80 (FIG. 5) to a suitable conveyor and thence to the finishing house where it is graded, coated and polished if desired and sent to storage or packing. These latter operations are conventional practices not within the scope of this invention.

Inert gas generator NN comprises a conventional apparatus for the exact combustion of a fuel, preferably natural gas, so that the combustion products are primarily nitrogen, carbon dioxide, water vapor and traces of oxygen, unburned hydrocarbons and carbon monoxide which are delivered at a pressure of from 5 to 10 p.s.i. The main inert gas ducts 51 and 51a originate from water knockout pot 51b, and through several branches supply both the bran desolventizer U and the rice desolventizer and deodorizer GG with a substantially oxygen-free inert atmosphere which will prevent explosions of solvent vapor in all apparatus throughout the proces. When drawn from branch inert gas pipes 76, 76a, 76b, and 76c it is preferably under a moderate pressure of 2 to 3 p.s.i. It will, therefore, flow freely through the deodorizer section 75 of apparatus GG and into other apparatus and vessels in which atmospheric pressure or a slight negative pressure exists due to vent connections from them to the main vent header which in turn connects to the vent condenser LL and from thence to the vapor recovery system MM in which there is a final vent. A pressure of 5 to 6 p.s.i. in the main inert gas ducts 51 and 51a is sufficient to deliver inert gas through differential pressure control valves 52 and 81 into the return recycle gas ducts 46 and 74, respectively, to maintain a constant pressure differential between them and the recycle blowers' discharge lines 49a and 70, respectively. Thus, a constant driving force is provided through both desolventizing systems, regardless of the pressure drop through their respective recycle condensing and gas heating apparatus due to condensation of solvent vapor.

Referring to the flow diagram of the recycled gas system in FIG. 5, pipe 51a and its regulating valve 81 maintain the PV relationship in the recycled gas required to provide the proper pressure differential between lines 70 and 74. The blower HH withdraws through duct 68 the full volume of the recycled desolventizing gas which enters section 66, plus the evaporated solvent vapor from section 66 of vessel GG, and propels this volume of gas mixture through condenser JJ, knockout 73, heater KK and pipe 74. The decrease in gas volume and the pressure drop which occur in condenser JJ, the losses of incondensibles from a vent header connection from knockout section 73, require an inert gas makeup into pipe 74 from pipe 51a through control valve 81 which is governed by the unnumbered differential pressure controller. The latter is set to maintain a selected pressure differential between pipes 70 and 74 with the pressure always higher in pipe 70.

A further purpose of this pressure differential control system is to provide stabilization of the system once an operational equilibrium is established, and, of course, to initially establish the proper pressure balance and gas flow rates before solvent evaporation has been fully established and the operational equilibrium has been reached. To take care of sudden pressure surges in the system due to faulty operation of pressure control valve 81 and its differential controller, a pressure control valve from the knockout section 73 apparatus KK is provided.

The inert gas delivered to the rice desolventizing system from inert gas generator NN, water knockout 51b and pipe 51a; and also that similarly delivered through pipe header 51 to the bran desolventizing system can be supplied by readily available commercial generators to have an analysis substantially as follows when burning gulf coastal natural gas:

Dry gas basis, percent
Carbon dioxide _____ 12.0
Unburned combustibles _____ .5
Oxygen _____ .5
Nitrogen (by difference) _____ 87.0

Depending on the final temperature of the inert gases delivered to the apparatus GG or U, etc. the inert gas will contain some water vapor essentially as follows:

TEMPERATURE OF SATURATED GAS [1]

| | Degrees Fahrenheit | | | | |
| --- | --- | --- | --- | --- | --- |
| | 90 | 95 | 100 | 105 | 110 |
| Saturation humidity (lbs. water/lb. dry gas) | 0.03115 | 0.03668 | 0.04312 | 0.05061 | 0.05932 |
| Saturation moisture (lbs. water/cu. ft. sat. gas) | .00214 | .00248 | .00286 | .00329 | .00377 |

[1] Pressure, 29.921″ Hg.

Although the amount of moisture in the saturated inert gas is small, it is nevertheless important in the prevention of moisture loss from the milled rice during desolventizing which causes brittleness and a chalky-white appearance in the kernels. Its presence also reduces the partial pressure of the hexane and allows its removal at lower temperatures, a function which is also common in various degrees to the other inert gas constituents. As may be seen from the preceding table, if the inert gas is delivered from generator NN at 105° F. and enters a recycle gas stream in pipe 74 from heater KK which has been heated to above 105° F. there will be no condensation in the gas stream along its path to desolventizer GG. However, assuming that the entering inert gas is only slightly superheated above its saturation temperature and the gas is exhausted from nozzle 68 at 95° F., there will have been a moisture loss equal to 0.05061 minus 0.03668 lb. water/lb. dry gas from the entering inert gas stream to the rice and evaporated hexane.

Assuming that approximately 1.25 to 1.5 lbs. of this slightly superheated (above its saturation temperature) inert gas stream is used per pound of solvent-wet rice per hour, the maximum quantity of moisture that could be absorbed by the rice, assuming that all moisture condensed between the saturation temperatures of 120° F. and 95° F. was thus absorbed and none was absorbed in the increased volume of gases due to the evaporated hexane vapors in the gas stream discharged from exhaust duct 68, would be 1.5 (0.05061−0.03668)=0.0209 lb. moisture per lb. of rice or 2.09% of the weight of the rice.

However, the solvent retention by the drained and vibrated rice received from desolventizing screen EE should not exceed 6% of the weight of the rice. Since solvent penetration into the rice kernel does not exceed a few hundredths of an inch, most of it exists as free interstitial liquid solvent which together with the small mount of solvent to be removed from the kernels is readily vaporized and removed by the substantially moisture saturated recycled gas. Thus, there is at most only inconsequential absorption of moisture from the recycled gas by the rice which occurs temporarily during the volatilization of the solvent which has only slightly penetrated its outer surface.

Rice, due to its crystalline or vitreous structure, is very sensitive to temperature changes, and particularly those that affect its normal moisture content which ranges between 10% and 13% when ready for milling. Once the bran layers and germ are removed, the moisture content will decrease slightly. However, the milled rice is even more sensitive to changes in temperature and in its moisture content. An advantage of desolventizing at a low temperature with nearly water saturated combustion products within a relatively narrow gas temperature range of between about 100° F. and 150° F. (and preferably between 110° F. and 130° F.), and withdrawal of the discharged gas-hexane vapor mixture within the range of 90° F. to 120° F. (and preferably within the range of 90° F. to 110° F.), is the effective removal of the solvent without the necessity for raising the temperature of the rice.

The mean molar heat capacities of the combustion gas mixture of carbon dioxide, nitrogen, trace constituents and water vapor between the entering and discharge temperature ranges above given, when used in the proportion of 1.25 to 1.50 lbs./lb. of rice/hr., are ample to effect substantially complete desolventizing in section 66 of apparatus GG, but the use of additional combustion gas in the lower deodorizing section 75 at temperatures ranging between 90° F. and 110° F. and in the proportion of from 0.125 to 0.200 lb./lb. rice/hr. is sufficient to guarantee the continuous production of an excellent grade of non-chalky, solvent-free milled rice of excellent color without incurring any significant breakage in the desolventizing operation.

Optimum conditions occur when the drained rice from desolventizing screen EE is in a fully enclosed system which prevents flash evaporation of part of the residual solvent from the rice entering section 66 at a temperature within the range of 105° F. to 115° F. This not only prevents checking of the kernels from flash cooling, but in addition retains the sensible heat of the rice to assist in desolventizing it in section 66 in contact with the inert gas recycle stream which completes the solvent removal. The latter occurs without raising the temperature of the rice and further insures against checking of the kernels.

Thus, in addition to protecting the rice from moisture losses, the introduction of an inert gas which is only slightly superheated above its saturation point reduces the partial pressure of the solvent and effects its removal at lower temperatures than is possible with superheated, substantially anhydrous solvent vapors which withdraw moisture from the outer surfaces of the kernels during the volatilization of the solvent therefrom. The latter accounts for the chalky whiteness observed in rice desolventized by the superheated hexane recycle gas method.

The rice kernels then cool slowly in the 90° F. to 110° F. atmosphere in the lower deodorizing section 75 and should be discharged from vapor lock 80 into a room atmosphere which has its temperature within the range of 70° F. to 80° F. to gradually reduce its temperature before it enters storage.

As stated above, FIG. 1 is a simplified schematic drawing of the system for generating and recycling the gaseous medium as previously taught in greater detail in reference to FIGS. 3–5. The same numerals are used to denote the same parts and the operation thereof is the same unless stated otherwise. Hence, emphasis is here placed upon describing the system for handling the gaseous medium and reference should be made to FIGS. 3–5 for specific details, particularly concerning the handling of the rice and bran fractions in relation to the gaseous medium. In summary then, inert gas generator NN supplies a continuing source of inert gas to the desolventizing system associated with rice desolventizer GG through differential pressure control valve 81. The medium is withdrawn from desolventizer GG by blower HH and transmitted to condenser JJ and thence to water knockout section 73 of heater KK where it is heated for recycle back to desolventizer GG.

Similarly, additional makeup inert gas is supplied from generator NN through differential pressure control valve 52 to line 46 which transmits the medium to bran desolventizer U from which it is drawn by blower W and transmitted to condenser X and thence to knockout section 50 of heater V where it is heated for recycling to desolventizer U. Hence, it may be said that the desolventizing mediums for both the rice desolventizing apparatus and the bran desolventizing apparatus are separately condensed to remove the solvent vapors therefrom heated and recycled.

An alternate embodiment of the system for handling the gaseous medium is shown in FIG. 2 which is somewhat simplified with respect to that shown in FIGS. 1 and 3 to 5, and which has certain advantages thereover, as will be explained hereinafter. It is to be understood that many of the components of this system will be the same as with the previous embodiment, and that identical numerals have been used to designate corresponding apparatus which function in the same manner. Hence, reference should be made to the specific description of FIGS. 3–5 for details of how rice and bran fractions are handled in relation to the gaseous medium, the alternate system for which will now be explained. In this alternate arrangement of the gaseous medium system, condenser JJ has been eliminated, and blower HH removes the gaseous medium from rice desolventizer GG through vapor scrubber 70a, which is of conventional type and is provided with nozzles connected to a source of liquid solvent and arranged such that the gaseous medium is passed through a fine spray which removes the bran dust therefrom. The liquid discharge from scrubber 70a may be collected in conventional manner. The gaseous medium is then transmitted by conduit 70 to heater V (which has knockout section 50 removed) where it is heated and transmitted to bran desolventizer U through ducts 46 and 48, for passage upwardly through desolventizer U. At the same time, additional inert gas is passed through bran holder 47 via line 51c which is connected to duct 51 as shown. This assures complete desolventizing of the bran in holder 47. The gaseous medium is withdrawn from desolventizer U and transmitted through pipe 49a to condenser X by operation of blower W. From condenser X the gaseous medium is transmitted by conduit 72 to knockout section 73 of heater KK, from whence it is conducted to the desolventizer unit GG through conduit 74.

Makeup inert gas from generator NN is supplied to the system through differential pressure control valves 52 and 81 in the same manner as in the embodiment shown in FIGS. 1 and 3 to 5.

The heavily loaded solvent vapor-inert gas stream leaves bran desolventizer U through pipe 49, and is compressed in high-pressure turbine blower or rotary compressor W and travels through pipe 49a to condenser X where from 60% to 90% of the solvent is removed, thus providing a recycled gas containing from 75% to 95%, or higher, of inert gas content, expressed as a volume or molal content. The condensate from condenser X is arranged to enter solvent separator Y and the stripped inert gas stream which still carries some solvent connects to pipe 72, which delivers it through knockout section 73 as described above.

The advantages of this modification are several:

(1) The two recycled gas streams from the rice and bran desolventizers are merged into one stream which has initially the size of the rice stream alone. Starting with inert gas from generator NN which enters pipe 74, the recycle system for desolventizer GG is eliminated.

The volume of desolventizing gas required in GG is relatively large because of the small enthalpy of the 120° F. gas which enters it. Therefore, it may be sent directly to heater V and is recycled at a much higher temperature (240° F.–300° F.) to the bran desolventizer U. The spent gas from U is then condensed in condenser X where its temperature and solvent content are both drastically reduced, from which it is returned to the rice desolventizing system heater KK and thence to the rice desolventizer GG.

(2) 22,000 lbs./hr. of rice at 5% hexane contains 1100 lbs./hr. of hexane to be evaporated without heating the rice kernels to above 120° F. By concurrent evaporation, higher recycle gas temperatures can be used without substantially raising the temperature of the rice kernels. 3000 lbs./hr. of wet bran will not contain over 1200 lbs./hr. of hexane, which is about the same quantity that is in the milled rice. The hexane in the bran may be evaporated at much higher temperatures in a very small equipment system, especially if the modified Schneckens apparatus illustrated as desolventizer U in FIG. 3 is used. The temperature increase from 100–120° F. to 240–300° F. reactivates the gas as a desolventizing medium.

(3) Better heat economy results. Also, besides eliminating some equipment and considerable piping, the entire installation is more compact. A very great improvement in plant layout is possible.

(4) The condenser water requirements of the system are reduced.

(5) A better opportunity is afforded to properly trap the polish dust from desolventizers GG and U where it actually belongs; i.e., in the bran rather than in condensers, heaters, etc.

(6) The recycle gases from condenser X to the knockout section 73 of heater KK can be supplied to desolventizer GG in cleanly washed condition due to the heavy solvent condensation which occurs in condenser X and the elimination of solids-contaminated solvent mist in knockout section 73.

(7) The desolventizing effect of a gas stream comprising a major proportion of inert gas is high. For instance, each 1000 cu. ft. of the mixed gas stream from desolventizer GG at 0 p.s.i.g. and 100° F. will contain 655 cu. ft. of inert gas and 335 cu. ft. of hexane vapor which, were it compressed to 5 atmospheres and condensed at 70° F., would yield 66.8 lbs. of hexane. However, if instead of condensing at this point, the gas mixture is heated to 300° F. in recycle heater V, then is used to desolventize the bran, is discharged from bran desolventizer U at 130–180° F. and 0–2.5 p.s.i.g., and then condensed at 70° F., the condensed hexane per M cu. ft. of recycled inert gas would be much higher than when condensed at the same pressure and temperature from the rice desolventizing step, per se. This is due, of course, to the greater solvent capacity of the hotter recycle gas stream.

The solvent used to extract the rice and bran may be any suitable commercially available type such as hexane, heptane, trichloroethylene, ethylene dichloride, substantially anhydrous isopropanol, or the like, which are commonly used in solvent extraction processes. Constant boiling azeotropes comprising one or more solvents with small proportions of water are also contemplated. Hexane is the preferred extractive solvent because of its ready availability and low cost, and its ready recovery by evaporation and steam stripping.

Desolventizing the clean rice may be accomplished in any of several types of apparatus. However, since rice is a special case requiring careful handling to preserve it as whole grains to the greatest possible extent, it is preferred that it be desolventized in a housing wherein the rice is placed in a semi-fluidized condition, as does a baffled vertical column type desolventizer similar to that illustrated in FIG. 5, wherein the fully washed, solvent wet, clean rice enters at the upper part of the desolventizer and is contacted by a pressurized stream of inert combustion gas, or mixture of an inert gas and solvent and vapor which has been superheated to allow rapid vaporization and removal of the solvent from the rice mass as it moves downward in a slightly expanded bed in a state of incipient fluidization to promote rapid circulation of a desolventizing vapor within the moving bed of rice. The gases from the operation are sent in part or entirely through a recycled gas condenser and thence to a recycled gas heater before being returned as superheated recycled gas to the desolventizer. Since 90% to 95% of the total solids entering as brown rice are received and desolventized in this apparatus, it must be of high capacity to permit fast throughput in which the rice is not subjected to temperatures exceeding 140° F., as temperatures above this value result in heat checking and breakage of the rice.

The total bran and polish solids represent only about 5% to 10% of the weight of brown rice entering the process. Therefore, in a plant which processes 25,000 pounds of brown rice per hour, the hourly bran polish production does not necessarily exceed 2,500 pounds on the dry basis. The solvent content of the bran and polish solids entering the byproduct solids desolventizer does not exceed about 50% by weight of these solids. While any of several types of desolventizers inclusive of desolventizer-toasters, flash desolventizer systems, and steam jacketed dryers commonly known as Schneckens apparatus, may be used in desolventizing the solids at temperatures up to 330° F., the applicant prefers to use a modified Schneckens apparatus similar to that illustrated at U (FIG. 3) which is equipped with a holding tank at its discharge end to which may be introduced either saturated or superheated gas, with or without added steam, which sweeps countercurrently through the solids and evaporates the solvent with the aid of indirect steam heat provided by a surrounding steam jacket or within hollow flights of the screw flights within the apparatus. The solvent containing inert gas is exhausted from the apparatus by a recycle gas blower and sent wholly or in part to a recycle gas condenser before being sent to the recycle gas heater from which the superheated gas is returned to the bran holding tank and the cycle is repeated.

It is to be understood that the present invention is not limited to either a vertical cascading tower or to countercurrent flow of rice and gases in order to be carried out properly. For example, a series of vapor-tight vibrating screen conveyors equipped for either concurrent or countercurrent flow may be used, which conveyors may be arranged end to end or in superposing relationship. Referring now to FIGS. 6 and 7, an alternate desolventizing apparatus for the rice will be explained, which alternate embodiment may be described as a vibrating, spring-mounted drying conveyor which may be connected to receive the gaseous medium of this invention and arranged to convey the rice in a semi-fluidized state so as to contact the gaseous medium with the rice.

More specifically, FIG. 6 shows three such units generally designated by the numerals 201, 202 and 203, connected in series, and each having a vibrating screen surface 204 which is arranged to advance the rice from left to right therealong, and a plurality of side inlets 205 which are arranged to receive the gaseous medium therethrough and to direct it upwardly through the screens 204. Inlets 205 to units 201 and 202, may for example, be connnected to conduit 74 of the previous embodiment so as to receive the desolventizing gaseous medium thereinto.

Each of the units 201, 202 and 203 has outlets 207 in the top thereof through which the gaseous medium is discharged, and in the case of units 201 and 202, the outlets 207 may be connected to conduit 70 of the previous embodiment.

The inlets 205 to unit 203 may be connected to conduit 76 of the prior embodiment thereby making unit 203 a deodorizing section, with the outlets 207 thereof being arranged to recycle through unit 202 as shown by small blowers or the like.

The sections or units 201, 202 and 203 may be arranged in horizontal sequence as shown above, or in vertical stacked alignment. In concurrent flow, the gaseous medium enters the inlets 205 as described and rice enters through vapor lock A. The desolventizing medium leaves at the upper outlets 207, as described above, and the partially desolventized rice then travels to unit 202 where it is contacted with additional gaseous medium, which may be made up from recycled gas and fresh inert gas from unit 203. The desolventized, deodorized rice leaves unit 203 through a vapor lock B.

When units 201, 202 and 203 are stacked vertically, the sequence is the same. Intermediate vapor locks between the sections are not required when the first unit, i.e. 201 is fed concurrently. The same applies to unit 202. There may also be small countercurrent recycle blowers between subsections of each unit 201, 202 and 203.

It is to be understood that other types of desolventizing apparatus could be used, including non-vibrating conveyors of the fluidized bed type, rotating cylinders fitted with lifters, or moving belts in vapor locked horizontal or vertical enclosures or the like.

Further modifications may be made in the invention as particularly described without departing from the scope thereof. Accordingly, the foregoing description is to be construed as illustrative only and not as a limitation upon the invention as defined in the following claims.

What is claimed is:

1. The method of desolventizing solvent extracted milled rice, said method comprising the steps of:
    passing said rice through a first chamber; passing through the solvent-wet rice in said first chamber at a temperature below the boiling point of the solvent a desolventizing gaseous medium comprising as a major component thereof an inert moisture containing gaseous mixture resulting from a combustion process to thereby evaporate the solvent from said rice, said medium being at a temperature in the range from about 100° F., to about 150° F. upon introduction into said first chamber;
    withdrawing said medium from said first chamber with vaporized solvent contained therein, said medium being at a temperature in the range of from about 95° F. to about 120° F. upon withdrawal therefrom;
    condensing a major portion of said vaporized solvent from the entire volume of said withdrawn medium;
    heating said medium after said condensation of solvent therefrom;
    and recycling said heated medium to said first chamber.
2. The invention as claimed in claim 1 wherein:
    said medium is substantially oxygen free.
3. The invention as claimed in claim 1 wherein:
    said medium is substantially water-saturated upon withdrawal from said first chamber.
4. The invention as claimed in claim 1 including:
    selectively adding additional inert gas to said medium to make up losses of gas therefrom.
5. The invention as claimed in claim 1 wherein:
    said rice is passed from said first chamber to a second chamber;
    and a second desolventizing gaseous medium comprising inert gas as the major component thereof is passed through said second chamber in contact with said rice therein to vaporize solvent therefrom.
6. The invention as claimed in claim 5 wherein:
    said second medium is substantially moisture saturated at a temperature in the range of from about 90° F. to about 110° F. upon introduction into said second chamber.
7. The invention as claimed in claim 1 wherein said rice is a fraction obtained from a rice solvent extractive milling process wherein there is produced said rice fraction and a bran fraction, both fractions of which have been solvent extracted with a volatile solvent, said method including the additional steps of:
    passing said bran fraction through a separate bran desolventizing chamber;
    passing a desolventizing gaseous medium comprising inert gas as the major component thereof through said separate chamber to thereby vaporize solvent contained in said bran fraction;
    and withdrawing said medium from said separate chamber and condensing solvent therefrom.
8. The invention as claimed in claim 7 wherein:
    said second medium is at a temperature in the range of from about 150° F. to about 330° F. upon introduction into said separate chamber.
9. The invention as claimed in claim 7 including:
    selectively adding additional inert gas to said desolventizing medium to make up losses of gas therefrom.
10. The invention as claimed in claim 7 wherein:
    said desolventizing gaseous medium is separately condensed to remove solvent vapors therefrom, and is separately recycled to the said bran desolventizing apparatus.
11. The invention as claimed in claim 7 including:
    reheating the said desolventizing gaseous medium following condensation of solvent vapors therefrom to a temperature in the range of from about 150° F. to about 330° F., and recycling the heated desolventizing gaseous medium to the said bran desolventizing chamber.
12. The method of separately desolventizing the milled rice fraction and the bran fraction obtained from a solvent extractive milling process, said method comprising the steps of:
    passing said rice fraction through a first chamber;
    passing said bran fraction through a separate bran desolventizing chamber;
    passing a desolventizing gaseous medium comprising inert gas as the major component thereof through said first chamber to thereby vaporize solvent contained in said rice fraction, said medium being at a temperature in the range of from about 100° F. to about 150° F. upon introduction to said first chamber;
    withdrawing said medium from said first chamber with vaporized solvent contained therein;
    heating said medium withdrawn from said first chamber to a temperature in excess of the boiling point of the solvent and below the temperature which is deleterious to said bran fraction, and then introducing said medium into said separate bran desolventizing chamber to thereby vaporize solvent contained in said bran fraction;

withdrawing said medium from said separate chamber and condensing solvent therefrom;

and recycling said condensed medium to said first chamber.

13. The invention as claimed in claim 12 wherein:
said medium withdrawn from said first chamber is heated to a temperature in the range of about 150° F. to about 330° F. upon introduction into said separate bran desolventizing chamber.

14. The invention as claimed in claim 12 wherein:
said condensed medium is heated to a temperature in the range of from about 100° F. to about 150° F. before recycling to said first chamber.

15. The invention as claimed in claim 12 wherein:
said medium is a gaseous mixture resulting from substantially perfect combustion of a hydrocarbon fuel.

16. The invention as claimed in claim 12 including:
selectively adding additional inert gas to said medium prior to introduction of said medium into each of said first chamber and said separate bran desolventizing chamber to make up losses of gas.

References Cited
UNITED STATES PATENTS

| | | | |
|---|---|---|---|
| 2,571,143 | 10/1951 | Leslie | 34—182 |
| 2,691,830 | 10/1954 | Karnofsky | 34—13 |
| 3,261,690 | 7/1966 | Wayne | 99—80P.S. |
| 3,421,902 | 1/1969 | Wayne | 99—80P.S. |

EDWARD J. MICHAEL, Primary Examiner

U.S. Cl. X.R.

99—80